(12) United States Patent
Jakob

(10) Patent No.: US 6,601,698 B2
(45) Date of Patent: Aug. 5, 2003

(54) DEVICE FOR LINKING CONVEYOR BELTS, METHOD FOR MAKING SAME AND METHOD FOR MOUNTING SAME ON A CONVEYOR BELT

(75) Inventor: Horst Jakob, Deaux (FR)

(73) Assignee: Aser, Saint Chamond (FR)

( * ) Notice: Subject to any disclaimer, the term of this patent is extended or adjusted under 35 U.S.C. 154(b) by 201 days.

(21) Appl. No.: 09/936,896

(22) PCT Filed: Jan. 16, 2001

(86) PCT No.: PCT/FR01/00130

§ 371 (c)(1),
(2), (4) Date: Jan. 2, 2002

(87) PCT Pub. No.: WO01/53715

PCT Pub. Date: Jul. 26, 2001

(65) Prior Publication Data

US 2002/0134652 A1 Sep. 26, 2002

(30) Foreign Application Priority Data

Jan. 19, 2000 (FR) .............................. 00 00735

(51) Int. Cl.[7] .......................... B65G 17/00; B65G 15/34
(52) U.S. Cl. .................................. 198/844.2; 198/847
(58) Field of Search ............................. 148/844.2, 847; 474/255, 257

(56) References Cited

U.S. PATENT DOCUMENTS

| 752,512 A | * | 2/1904 | Buckley | 474/257 |
| 2,446,311 A | * | 8/1948 | Traxler | 474/257 |
| 3,279,090 A | * | 10/1966 | Harper | 474/257 |
| 5,573,470 A | * | 11/1996 | Jakob | 198/844.2 |
| 5,839,571 A | * | 11/1998 | Jakob | 198/844.2 |

FOREIGN PATENT DOCUMENTS

| DE | 25 32 409 | 2/1977 |
| WO | WO 95/11393 | 4/1995 |
| WO | WO 97/26466 | 7/1997 |

* cited by examiner

Primary Examiner—Christopher P. Ellis
Assistant Examiner—Gene O Crawford
(74) Attorney, Agent, or Firm—Young & Thompson

(57) ABSTRACT

One of the junction devices for a conveyor belt comprises three parts, namely an upper part (2), a lower part (3) and an intermediate part (4). Inserts (6') and (7') are used to assemble parts (2) and (3) using screws (5). Inserts (6) and (7) are used to assemble the junction device on the ends of a conveyor belt.

15 Claims, 5 Drawing Sheets

DEVICE FOR LINKING CONVEYOR BELTS, METHOD FOR MAKING SAME AND METHOD FOR MOUNTING SAME ON A CONVEYOR BELT

BACKGROUND OF THE INVENTION

This invention relates to the field of non-disconnectable junction devices intended to join together the ends of conveyor belts. For simplification purposes, the term "conveyor belt" in this description will be used to refer to conveyor belts and power transmission belts.

In the past, junction devices have been used with a general H-shaped section that can be fixed on the ends of a conveyor belt. These junction devices comprise two pairs of attachment flanges corresponding to the flanges of the H-shaped section and an intermediate central part that corresponds to the web of the H-section. One of the ends of the conveyor belt is inserted between one of the pairs of flanges, and the other end is inserted between the other pair. The flanges are attached to the ends of the conveyor belt by means of rivets, nails, crampons, screw-nut systems or by cold gluing or flat vulcanisation of the flanges in contact with the flat outside surfaces of the conveyor belt engaged between the flanges. These junction devices are made of a flat elastic flexible material such as vulcanised rubber, or a synthetic material such as polyurethane, and they contain a built-in reinforcement. However, the proposed reinforcements were made of an ordinary fabric, and were not capable of sufficient elongation to pass over the conveyor belt drive or return rollers without causing damage to the junction device installed at the ends of the conveyor belt.

The applicant for this patent has deposited a previous patent divulging the use of fabrics or knits. For fabrics, he described the use of fabrics comprising a deliberately loosely woven weft so that this weft in the longitudinal direction would deform until the weft threads become tightened and transmit tension, in order to absorb the different path distances that occur in the junction device when passing over the drive or return rollers around which the conveyor belt on which the junction device is installed passes without any damage being caused, the loose threads thus tightened would be capable of transmitting a tension force for which they are designed, then being brought back together by the constituent material. The applicant for this patent had also described the use of platelets or washers in the flanges of the junction devices designed to fix these devices to the ends of the conveyor belt, these platelets or washers comprising a hole through which nails, rivets, crampons, screws or any other devices with a rod designed to pass through a flange, the conveyor belt and then the other flange could be inserted, and being fixed on the other side of the other flange. In a version comprising cables, the washers were anchored to the reinforcement composed of cables, through loops formed by these cables and surrounding the perforated washers. In the case of a fabric or knitted reinforcement, holes were formed in the flanges and consequently in the reinforcement.

Despite the essential improvements included in the solutions proposed in the past by the applicant for this patent application, it was found in practice that there were still limitations on the use of the resulting junction devices, namely:

fabrics with weft butt joints were not sufficiently flexible in the direction of motion of the conveyor belt when passing over some drive or return rollers encountered in practice, the construction of a channel-shaped conveyor belt was too difficult due to the excessive stiffness of the junction device preventing it from satisfactorily following the conveyor belt when the edges of the belt were lifted up for bulk transport purposes, in some cases, attachment of the flanges using single perforated reinforcing washers with conventional attachment means caused tearing of the reinforcements at the location of the holes formed in the reinforcements, and the resistance of the reinforcements was reduced due to the large number of small lesions caused by these holes, junction devices made by moulding or by injection required a different mould for each thickness of conveyor belt used in practice, for their production, and consequently they had to be manufactured in very small series which increased the cost price, and the manufacturing, storage and distribution price.

The purpose of this invention is to propose solutions to the problems described above.

SUMMARY OF THE INVENTION

The applicant discovered that to solve the problem of the necessary extendibility of the flanges of junction devices provided with fabric reinforcements it was useful if the texture of the fabrics was loose or if it was strongly curved in weft and in warp. The applicant also discovered that with these fabrics with a loose warp and weft, it was possible to use fabrics in one or several layers in two different arrangements.

According to a first arrangement, the reinforcing fabrics are arranged so that the direction of the warp or the weft is parallel to the longitudinal direction of the junction devices, in other words by convention along the direction of motion of the conveyor belt that must be fixed to it, independently of the effective dimensions of the junction devices. Similarly in this description, by convention, the transverse direction of the junction device will be the direction perpendicular to the longitudinal direction defined above.

According to a second arrangement, the reinforcing fabrics in which the warp and the weft are loosely woven, are arranged such that the warp or the weft are equally loose and form an angle from the longitudinal direction of the junction device, regardless of whether the fabric is arranged in a single layer or in several layers. The optimum angle is found to be approximately 45°.

All that has been said above about loosely woven fabrics that are loose in warp and in weft, is also applicable for knits, that can be knitted loosely in warp, while adding a weft that can be inserted loosely.

Using the solutions mentioned above, the applicant obtained reinforcements sufficiently flexible to accommodate all elongation necessary for the conveyor belts to pass over all rollers that have been encountered in practice.

However, the problems caused by attachment of the flanges onto the ends of conveyor belts, and particularly the problem caused by lesions in the reinforcements, have not been solved despite the improvements to the structure of the reinforcement described above.

Therefore, the applicant has designed and developed improved washers that are put into place so as not to cause any damage (or in any case only slight damage) to the woven or knitted reinforcement. These washers comprise a recess that will contain the head of the attachment means with a stem, this recess being extended as a tubular part, at least in some of the washers. The washers also comprise at least one pin oriented in the same direction as the recess, in other words towards the reinforcement, this pin being located at the periphery of the washer and preventing rotation of the washer. The reinforcement, composed of one or several layers of fabric or knit as described above, is arranged around the tubular part extending the recess perpendicular to the general plane of the washer such that the edges of the reinforcement surrounding the tubular part are raised along the tubular part also forming a right angle, or approximately a right angle, with the plane of the reinforcement. These raised edges of the reinforcement bond to the tubular part. With this conformation of the washer and its arrangement in the reinforcement, the reinforcement is not perforated consequently causing wires to be cut in the fabric or the knit, and instead the threads are simply separated. Obviously, it is possible that a thread can break but the lesion thus caused is much less serious than the lesion created by conventional holes cut in flanges by drilling or by punching. Furthermore, the diameter of the washer can be reduced due to the fact that the washer not only bonds flat to the reinforcement through its head, but it also bonds in the perpendicular direction through the outside surfaces of the tubular part to the raised edges of the reinforcement. Thus, the anchorage of the recess in the flange of the junction device is particularly good.

Furthermore, due to the fact that the head of the washer head is small, if necessary it may pivot by a few degrees from the perpendicular to the general plane of the flange considered due to the articulation caused by the fact that the angle formed between the plane of the majority of the reinforcement and its raised edges bonding to the tubular part of the washer, this capability being useful in combination with the attachment means described below. These washers thus shaped and placed are arranged in the flanges of the lower part.

In the upper part, the washers consist only of a perforated recess without a tubular part, and in the lower part the washers consist of a recess extended by a tubular part as described above. The tubular part of these washers is threaded on the inside. This arrangement enables the use of screws as an attachment means. A screw, preferably a self-tapping screw, inserted into the washers without a tubular part is screwed into the end of the conveyor belt after being inserted into the space between the two flanges of the same pair, until it stops in contact with the intermediate part of the junction device; the screw then enters the threaded hole in the tubular part of the washer in the other flange, the relative mobility of the tubular part with respect to the perpendicular to the general plane of the washer enabling mutual self-centering of the screw in the tubular part. By screwing into the tapped thread, the screw exerts a high tension on the washer through the tubular part of the washer, this tension causing efficient clamping of the two flanges in contact with the plane outside surfaces of the end of the conveyor belt. This tension is transmitted to the lower flange, both through the head of the washer and the outside surface of the tubular part to which the reinforcement is bonded, the surfaces of the reinforcement and the tubular part working in shear.

In practice, the washers and consequently the screws, are arranged to be staggered on the surface of the flanges to optimise distribution of the tightening points.

Additional improvements are explained later as part of the description of a preferred embodiment with reference to the figures in the drawing illustrating this description.

However, due to the excellence of these flange attachment means to the ends of the conveyor belt, the applicant has been able to solve the other problem that occurred initially, namely the problem of the large number of moulds and moulded products necessary for the various thicknesses of conveyor belts. The solution found consists of making junction devices in three separate parts; one part forming the left and right top flanges in a single piece, apart forming the left and right bottom flanges in a single piece, and an intermediate part corresponding to the central web of the H-section.

The top part comprises two or several washers of the type provided with a tubular part, smooth on the inside, built into the top part on a median line forming an imaginary separation between the left flange and the right flange, the tubular parts of the washers facing downwards.

The bottom part is provided with two or several washers of the type comprising a threaded tubular part built into the bottom part on a median line forming an imaginary line separating the left flange from the right flange, the tubular threaded parts facing upwards.

It should be clear that the concepts of top and bottom are only useful for the purposes of the description and that in practice they can be inverted.

The intermediate part is parallelepiped shaped, and it can be produced, stored and distributed in several different heights comprising built in bushings that pass through them in the direction of the height, and that have the same spacing as the built-in washers in the middle of the top and bottom parts, so that the built-in washers can be aligned with the top and bottom parts when the top and bottom parts are arranged on each side of the intermediate part. The diameters of the cylindrical assemblies composed of the tubular parts of the washers comprising raised parts of the reinforcement bonding to their outside surface and layers of rubber or synthetic material between which the reinforcement layers are sandwiched, are such that these cylindrical assemblies can be inserted in the corresponding bushings in the intermediate part. Thus, it is possible to screw in screws with a head that fits in the recesses of the inserts with a smoothed tubular part, the threaded stems of the screws passing through the bushings without screwing into them since the inside diameter of the bushing is greater than the outside diameter of the screw by at least twice the thickness of the reinforcement surrounding the tubular part of the washer. The screws are then screwed into the tapped thread of the threaded tubular parts of the built-in washers as described above, in the middle area of the lower parts.

Additional improvements will be described later in relation to a preferred embodiment illustrated by the figures.

Tests carried out showed not only the excellent quality of this assembly according to the invention, but manufacturing is also very much simplified compared with a junction device made from a single piece by moulding or by injection. The manufacture of the reinforcements and their arrangement in the moulds is very much simplified by making an upper part with a left upper flange and a right upper flange separately and connected by a median part, a lower part comprising a lift lower flange and a right lower flange connected by a median part, and an intermediate part provided by bushings that can be made in several different lengths.

BRIEF DESCRIPTION OF THE DRAWINGS

One preferred embodiment of the invention will now be described in detail with reference to the drawings in which.

DESCRIPTION OF THE PREFERRED EMBODIMENTS

Figure 1:
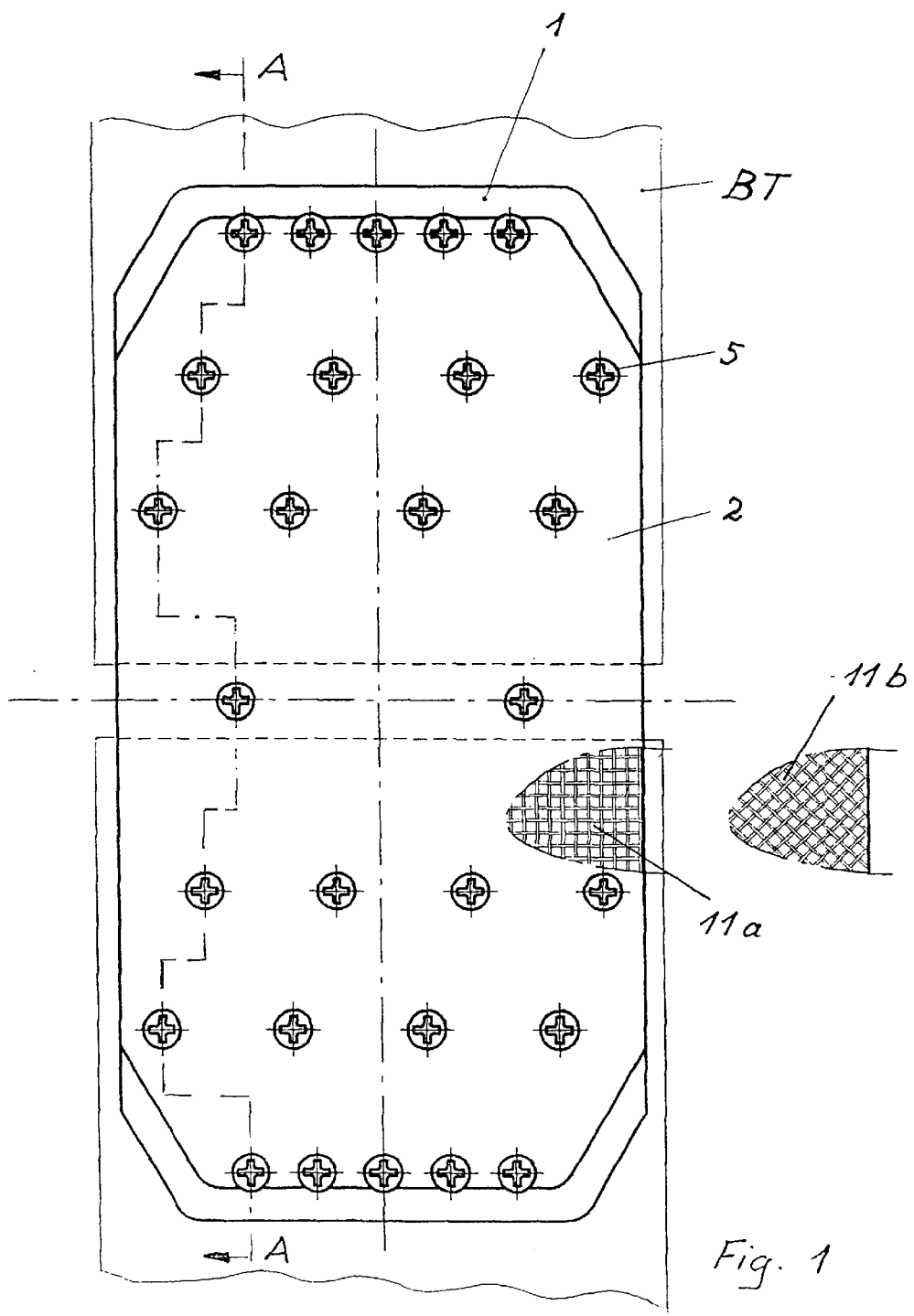
FIG. 1 is a plan view of a junction device according to this invention, seen from above.

FIG. 1 is a plan view seen from above showing a junction device according to this invention, and shows a top plate 2 of a junction device 1. Note also the heads of screws 5 that form the preferred means of assembly of junction devices according to the invention used in the preferred embodiment described herein. The exploded views 11a and 11b show two types of woven reinforcement according to the invention; in type 11a the fabric is arranged such that its weft threads, or its warp threads, are oriented at least approximately along the longitudinal direction of the junction device. Remember that by convention, for the purposes of this description, the longitudinal direction of the junction device is the longitudinal direction of the conveyor belt BT in FIG. 1, the junction device being mounted on the ends of the conveyor belt BT that it joins. According to the same convention, the transverse direction of the junction device is the direction perpendicular to the longitudinal direction. This convention is applied regardless of the effective dimensions of the junction device in the two directions. The junction device in FIG. 1 is composed of three elements, an element forming an upper plate 2, an intermediate plate located under the median part of the plate that is not visible in FIG. 1 other than by the two dashed lines located on each side of the two median screws 5, and an element forming a lower plate 3, not visible in FIG. 1, located under the intermediate element and under the element forming an upper plate 2.

Figure 2:
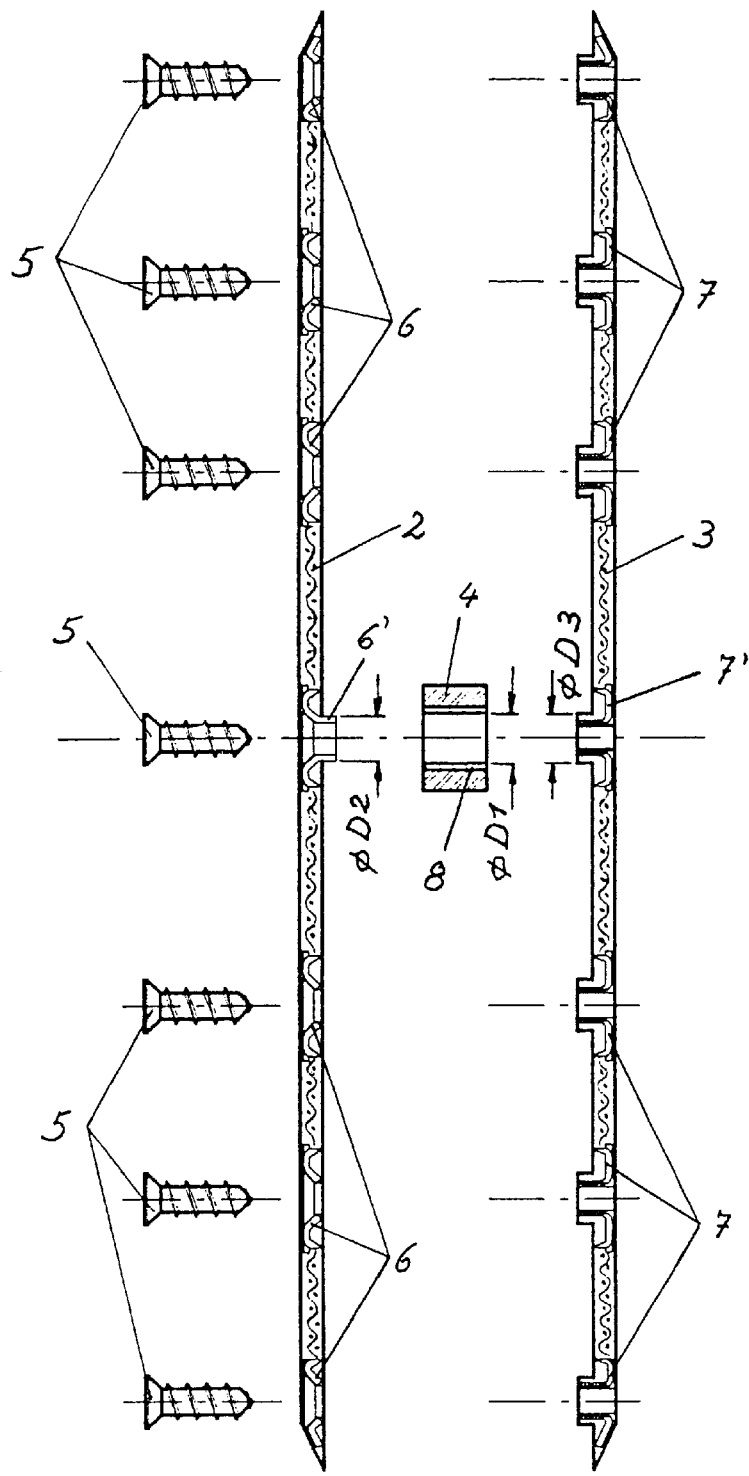
FIG. 2 is an exploded view of a longitudinal section along line A—A in FIG. 1 of a junction device according to this invention, showing the various component elements.

The exploded section in FIG. 2 shows a series of assembly screws 5, the top plate 2, and inserts 6 and 6' incorporated into the top plate 2; the intermediate element 4 comprises an incorporated through bushing 8 arranged vertically, the lower plate 3 comprising threaded inserts 7 and 7'. The inserts 6 are usually in the form of drilled washers comprising a recess that will hold the heads of the screws 5 that will pass through the holes in the drilled washers. Other details are described later. The central insert 6' is generally arranged like the inserts 6 but it comprises a central tubular part for which the inner cylindrical surface D2 is designed to allow the corresponding screw 5 to pass through it with a very small clearance, therefore this screw does not screw into the insert 6'. The central tubular part of the insert 6' projects beyond the lower surface (right on FIG. 2) of the upper plate 2.

The inserts 7 each comprise a central tubular part of which the inner cylindrical surface is threaded and is capable of holding a screw 5 screwed into the tapped thread, the said central tubular parts projecting beyond the upper surface (left in FIG. 2) of the lower plate of the junction device. Details showing an important improvement are described later in relation to FIG. 8. The median inserts 7' of the lower plate are like the inserts 7.

Figures 3, 4:
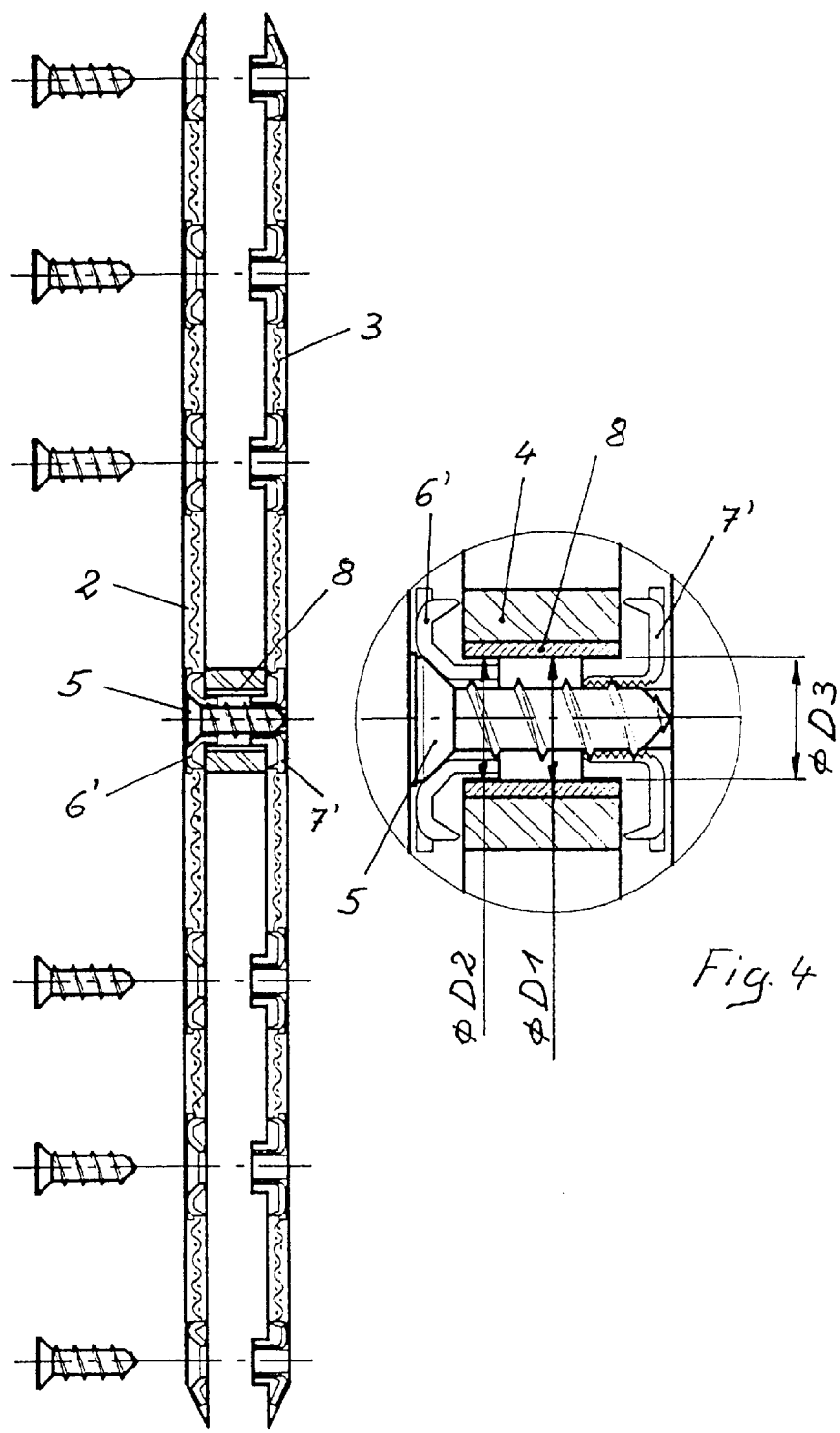
FIG. 3 is a longitudinal section along line A—A in FIG. 1, showing the junction device according to this invention in FIG. 2, its three elements being assembled according to the invention.
FIG. 4 is an enlarged fragmentary sectional view of the assembly method shown in FIG. 3.

The sectional view in FIG. 3 helps to understand the assembly of the three elements of the junction device according to the invention in the form of a preferred embodiment described with relation to the drawings. It shows screw 5 passing through the tubular part of the central insert 6', its head being inserted in the recess and its stem being provided with a male thread passing through bushing 8 of the intermediate element without screwing into it. The lower part of this screw 5 is screwed into the thread in insert 7'.

It will be seen that the junction device assembled in this way is ready to be fitted onto the ends of a conveyor belt using the screws shown in waiting above the top plate.

FIG. 4 shows a magnified fragmentary view of the screw assembly in FIG. 3. It shows the screw 5, inserts 6' and 7', the tubular part of the insert 7', the outer surface of the insert being bonded to the parts of the reinforcement separated around the tubular part during placement of the insert in the reinforcement during the manufacturing of the junction device, as described later.

It will be seen that the outside diameter D2 of the part of the top plate 2 surrounding the tubular part of the insert 6' is very slightly smaller than the diameter D1 of the bushing 8 of the insert element 4, so that it can be inserted into the said bushing 8. Similarly, the diameter D3 of the part of the lower plate surrounding the threaded tubular part of the insert 7' is also very slightly less than the inside diameter D1 of the bushing 8.

Figure 5:
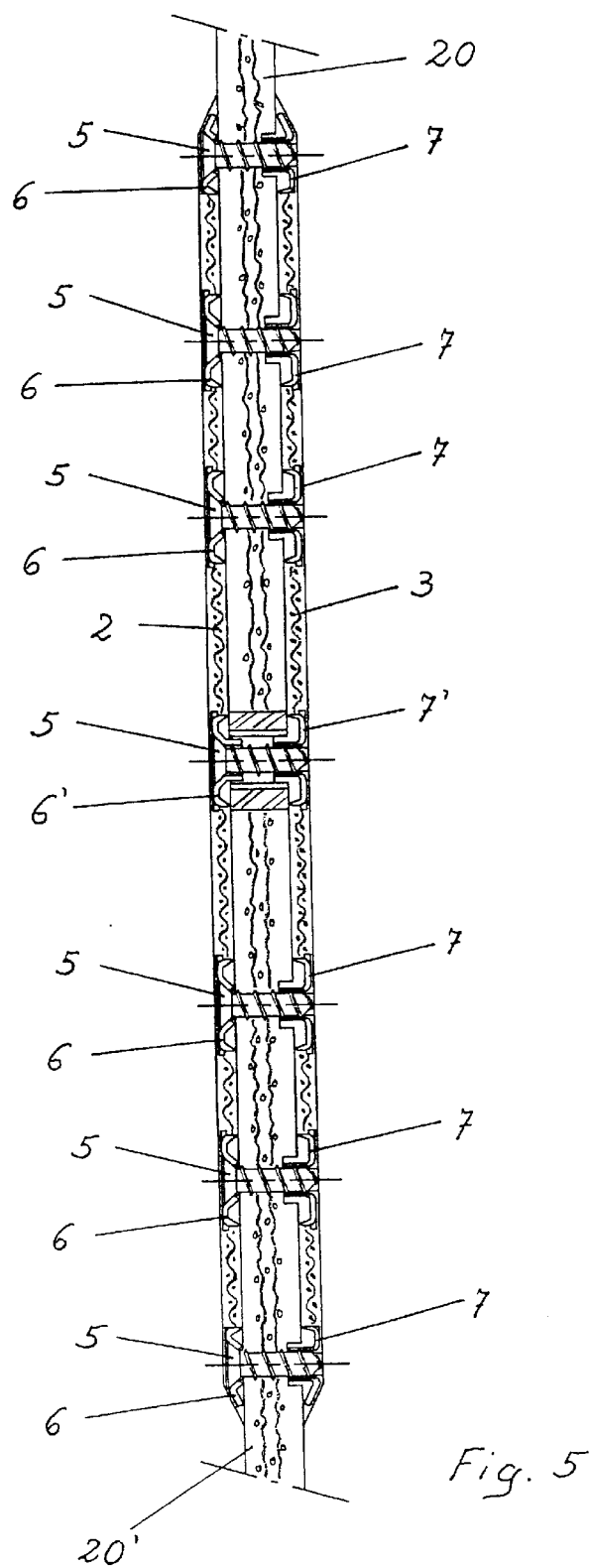
FIG. 5 is a sectional view along line A—A in FIG. 1 of the junction device according to this invention shown in FIG. 3, installed on the two ends of a conveyor belt.

FIG. 5, showing the same section as the previous figures, shows the junction device according to the preferred embodiment fitted on the ends 20, 20' of a conveyor belt. The screws 5 are engaged in the insert 6 and they pass through the thickness of the conveyor belt when they are screwed in, without a pilot hole since they are self-tapping. Since the recesses in the inserts 6 are not prolonged by tubular parts, and since the diameter of the holes in the washers of the inserts 6 is deliberately greater than the diameter of the threads of the screws 5, the screws 5 can easily oscillate if necessary, which may be the case if they are not perfectly centred in the threads of the inserts 7 after passing through the conveyor belt.

Figure 7:
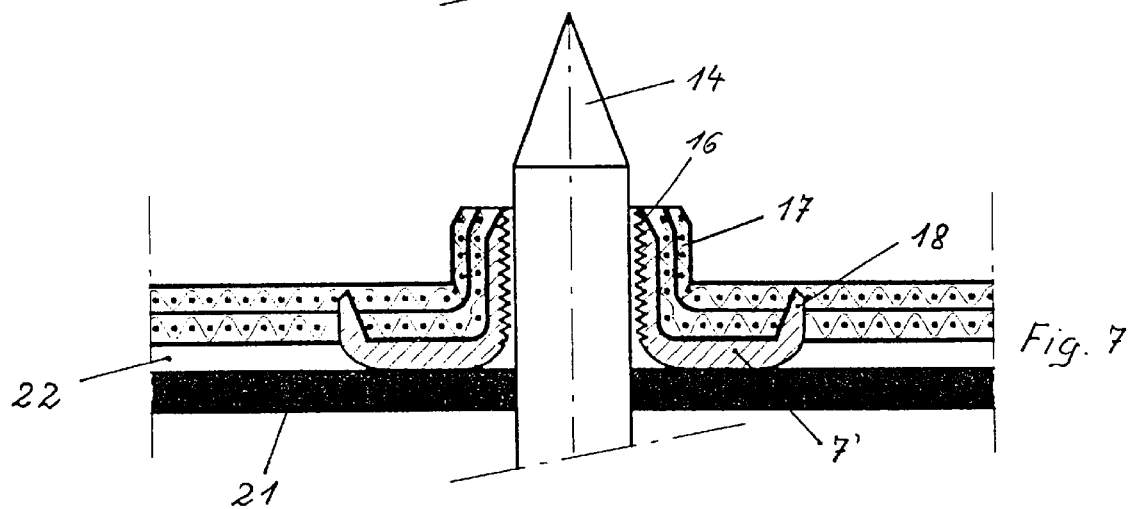
Figure 8:
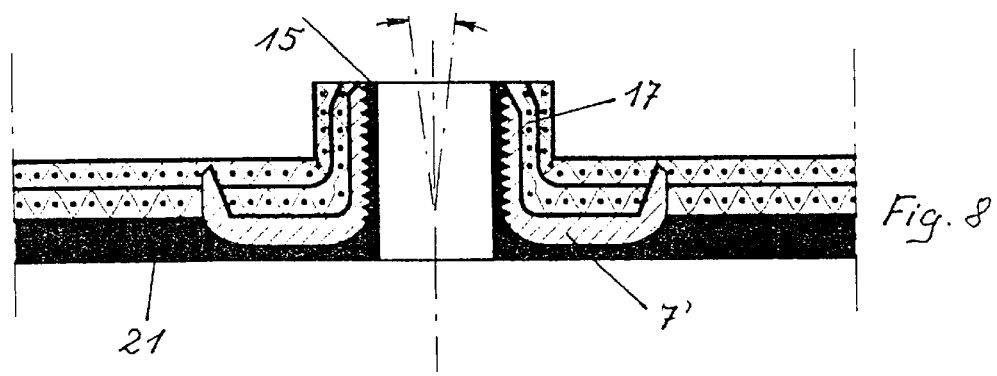

Important details in FIGS. 7 and 8 are that in the most advanced form of the preferred embodiment of the junction device according to the invention, the threads of the inserts 7 and 7' are coated with a coat of the material making up the junction device obtained during vulcanisation, or when the junction device is moulded by injection according to the process described later. Raised parts of the reinforcement can be seen, in this case composed of two layers of fabric or knit, sandwiched between the layers of vulcanised rubber, or synthetic material such as polyurethane. These raised parts bond to the outer surface of the threaded cylindrical part of insert 7'.

The advantage of these raised parts and the coating 15 on the thread 16 on inserts 7 and 7' will be described later.

Figure 6:
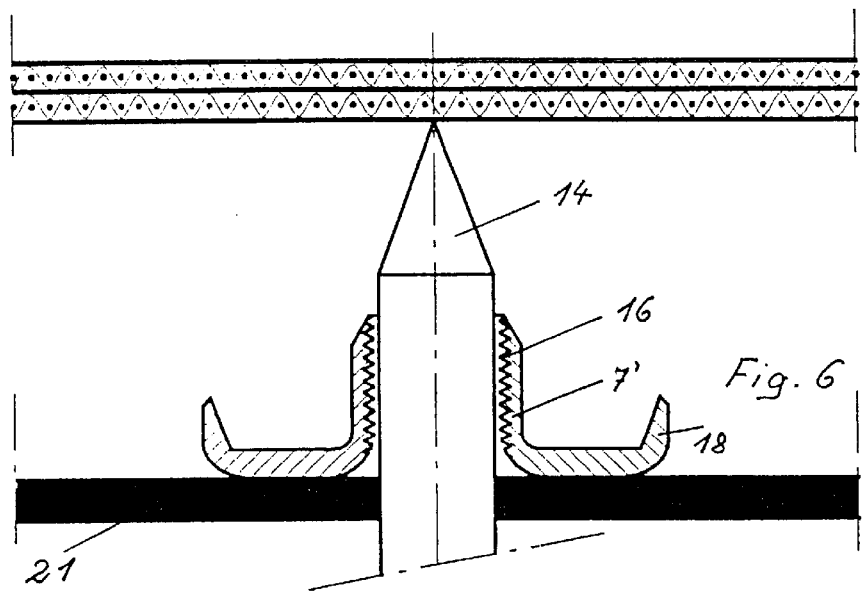
FIGS. 6, 7 and 8 show the successive phases in setting up a threaded insert in the lower part of a junction device according to the invention.

We will now explain FIGS. 6 and 7 which will help to understand the process by which the insert 7' shown in the finished state in FIG. 8 is incorporated.

FIG. 6 shows a layer of vulcanizable or thermoformable material 21 shown in black, through which a nail 14 passes. This nail 14 advantageously forms part of a vulcanisation half-mould (if the material from which the basic junction device is made is a vulcanizable rubber) or an injection mould when the basic material used is a synthetic material, for example a polyurethane. An insert 7' is inserted above the layer shown in black. Note that the stem diameter is less than the diameter of the tips of the tapping threads 16. This is done deliberately to leave space so that later, during the vulcanisation or injection step, the material can flow between the nail 14 and the tapping, consequently forming the coating 15 that can be seen in FIG. 8. The reinforcing layers are not yet threaded on the nail 14.

FIG. 7 shows the reinforcing layers threaded on the nail 14 and laid out in contact with insert 7', the pins 18 of the insert being forced into the reinforcing layers and the layers of material between which they are sandwiched. Note that at this stage, in other words before the mould is closed and before vulcanisation, a space 22 shown in white separates the lower reinforcing layer and the upper reinforcing layer 21 shown in black.

It will be understood that during vulcanisation, under the effect of pressure, the lower layer 21 of material is firstly forced into contact with the lower reinforcing layer to which it bonds, and secondly flows between the nail 14 and the thread of the insert 7', thus forming the coating 15 of the thread visible in FIG. 8.

Pins 18 forced into the two reinforcing layers sandwiched between the rubber layers (or the layers of synthetic material) can also be seen. These pins 18, of which there may be one or several (for example 4), are provided to prevent the threaded insert 7' from rotating when the screw is screwed into the tapping 16, particularly since in the most advanced version of the preferred embodiment described herein, the screw exerts a large torque as it is screwed into the tapped thread.

Furthermore, pins 18 are advantageously provided on inserts 6, 6' and 7, and the same problem arises to prevent the inserts from rotating while the screws 5 are being screwed in, however the pins are less important in inserts 6 and 6' since the screw only exerts a torque by friction of the head in the recess of the inserts 6 and 6' at the end of screwing. However, it is wise to provide at least one pin 18, or several pins (for example 4) on all types of inserts.

If the constituent material used for the junction device according to the invention is a synthetic material such as polyurethane rather than vulcanizable rubber, a similar process is done using injection. This implies a few variants to the process described below. Firstly, the manufacture of the sandwiched reinforcement between the layers of synthetic material is not as easy as it is in the case of vulcanizable rubber. For a synthetic material such as polyurethane, an impregnation of the reinforcement, fabric or knit may be necessary using an impregnation polyurethane; it would also be possible to use a roll of polyurethane sheets on the reinforcing layer(s). Furthermore, for the outer layer 21, this layer does not exist in advance as in the case of vulcanised rubber, but it is created by injection in the mould in which the sandwich of reinforcing layers threaded on the nails 14 and on the inserts 16 is located. Thus, by proceeding in this way to take account of injection needs, the end result for a synthetic material is the same, as shown in FIG. 8 with vulcanizable rubber.

The raised parts 17 of the reinforcement shown in FIGS. 7 and 8 that are bonded to the outside surface of the inserts 7' make it even more sensitive to tearing due to the fact that they work in shear and not in separation of the flat bonding parts.

Another advantage of the method of laying out the inserts 7 or 7' that can be seen in the finished state in FIG. 8 is due to the fact that the tubular parts of the washers can oscillate slightly around their normal position, in other words perpendicular to the general plane of the flange. This is possible because:

The tubular part of the inserts 7 is fixed to the raised parts of the reinforcement arranged in the top part of the lower flange between the thin layers from which the material is made.

The diameter of the washer part of the inserts 7 or 7' is smaller and it bears on the thick layer 21 of the elastic constituent material without any reinforcement between this layer 21 and the washer part of the insert 7 or 7'.

This possibility of oscillation around the perpendicular provides advantages in three cases:

When the junction device is being fixed on the ends of the conveyor belt, firstly the screw can oscillate as described above with respect to the washer part of the inserts 6, but also the tapped tubular part of the inserts 7 can also oscillate causing self-centering of the screw 5 and the threaded tubular part of the inserts 7 can be tapped without difficulty.

Therefore during use, when starting and stopping the conveyor belt, the differences in acceleration (positive or negative) between the top part of the conveyor belt that is loaded and therefore has a high inertia, and the lower part driven or braked by the drive device are easily absorbed.

FIG. 8 shows dashed lines showing the positions of the tubular parts of the inserts 7 during acceleration or braking of the conveyor belt. Therefore this configuration acts as a shock absorber.

Thus the coating 15 that could be considered as a disadvantage due to the vulcanisation or moulding process, has an unexpected advantage. The screw 5 that engages into the coating to screw into the tapped thread is strongly locked so that it resists loosening that could otherwise be caused for example by vibrations.

One variant of the invention allows for the outside diameter of the male thread to be slightly greater than the inside diameter of the bottom of the tapped thread. Screws made of a metal useable for self-tapping can be used so that the screw can engage more deeply into the tapped thread, thus giving a very long lasting bond between the screw 5 and the insert 7'.

The applicant has obtained even better results by using this type of screw in which not only the outside diameter of the thread exceeds the diameter of the tapped thread, but furthermore the pitch is not the same as the pitch of the tapped thread. A screw thus shaped will more or less destroy the existing tapped thread, while creating a new larger diameter tapped thread with a different pitch. The presence of debris from the initial tapping in addition to the coating material 15 makes the screws 5 thus screwed in almost unscrewable under the worst possible usage conditions. This has been confirmed by tests.

Therefore, it is easy to understand the advantage of the pins 18 present on the inserts, since they are often subject to high torques and tend to rotate while the screws 5 are being screwed into the threads of the inserts due to the conformations of the screws 5 and the tapped thread as described above.

Obviously, the preferred embodiment of the invention that was just described above does not exclude less sophisticated and less ambitious embodiments, but use the characteristics claimed in one or more of the claims given below based on the description.

The above description of the incorporation of inserts shows that separate moulding of two plates and an intermediate element is much simpler than moulding an entire junction device that involves complicated operations for the placement of reinforcing layers, the insertion of cores between the flanges allowing the nails to pass through, and complex mould removal operations. On the contrary, the process proposed in the invention enables a "waffle mould" type moulding that is very efficient and the proposed assembly mode adds the possibility of producing, storing and installing a variety of thicknesses of junction devices with a minimum investment in moulds and stocks.

Finally, in the preferred embodiments, it will have been seen that the top plate flanges comprise a relatively thick layer of material used on the outside and that the reinforcement is laid out asymmetrically within the thickness of the flanges, the layers of materials surrounding the reinforcement layers being thin. This conformation is not indifferent since it minimizes the thickness of the flanges of the junction devices, which is desirable for operation of the conveyor belt, and also allows the reinforcement according to the invention to be more flexible as it passes over the drive or return rollers while maintaining the excellent tension resistance qualities due to the fact that the proposed assembly system does not cause any lesions in the reinforcement of the junction devices or in the reinforcement of the conveyor belt.

What is claimed is:

1. A non-disconnectable junction device for connecting two ends of a conveyor belt having a longitudinal direction, the junction device comprising:

a flat upper part, a flat lower part, and an intermediate part between said upper and lower parts, each of said upper and lower parts being made of a flexible elastic material provided with a reinforcement, said reinforcement comprising a woven fabric that is loose in warp and in weft and that is flexible up to a defined limit in a first direction and in a second direction perpendicular to the first direction, said woven fabric having warp threads and weft threads, wherein one of said warp threads and said weft threads are arranged to form an angle with a transverse direction of the junction device, the transverse direction being perpendicular to the longitudinal direction.

2. The junction device of claim 1, wherein the other of said warp threads and said weft threads are arranged in the longitudinal direction.

3. The junction device of claim 1, wherein said angle is approximately 45°.

4. The junction device of claim 1, further comprising annular inserts in each of said upper and lower parts at corresponding positions, each of said annular inserts having a central depressed recess that defines a hole therethrough, the holes in said inserts in said lower part being threaded.

5. A non-disconnectable junction device for connecting two ends of a conveyor belt having a longitudinal direction, the junction device comprising:

a flat upper part, a flat lower part, and an intermediate part between said upper and lower parts, each of said upper and lower parts being made of a flexible elastic material provided with a reinforcement, said reinforcement comprising a textile that is flexible up to a defined limit in a first direction and in a second direction perpendicular to the first direction; and annular inserts in each of said upper and lower parts corresponding positions, each of said annular inserts having a central depressed recess that defines a hole therethrough, insides of the holes in said annular inserts in said lower part being threaded.

6. The junction device of claim 5, further comprising fasteners through corresponding ones of said annular inserts and wherein said fasteners have a diameter smaller than a diameter of said annular inserts in said upper part.

7. The junction device of claim 5, wherein each of said annular inserts has a pin in a periphery thereof that is oriented parallel to a longitudinal axis of said hole.

8. The junction device of claim 7, wherein each said pin extends into a respective one of said upper and lower parts.

9. The junction device of claim 5, wherein a median section of the junction device is arranged and adapted to be between the two ends of the conveyor belt, wherein said intermediate part comprises a bushing that connects corresponding ones of said annular inserts in said median section, and further comprising fasteners that extend through corresponding ones of said annular inserts and associated said bushing.

10. The junction device of claim 5, further comprising a layer of rubber or synthetic material coating at least one of said upper and lower parts and said annular inserts therein.

11. The junction device of claim 10, wherein said layer of rubber or synthetic material coats the threaded insides of said annular inserts in said lower part.

12. The junction device of claim 5, further comprising self-tapping screws through corresponding ones of said annular inserts.

13. A method of making a junction device for connecting two ends of a conveyor belt, the method comprising the steps of:

providing two half-molds, a lower one of the half-molds having projections from a bottom thereof;

forming a layer of vulcanizable rubber in the lower half-mold so that the projections extend through the layer;

placing annular inserts on the projections, each of the annular inserts having a central depressed recess that defines a hole therethrough, insides of the holes in the annular inserts being threaded;

placing a flexible elastic material on the projections in the lower mold, the flexible elastic material having a reinforcement, the reinforcement comprising a textile that is flexible up to a defined limit in a first direction and in second direction perpendicular to the first direction;

placing the molds together and pressurizing the joined molds so that the rubber covers the threaded insides of ti annular inserts; and removing the molded part, which constitutes a lower part of the junction device.

14. The method of claim 13, further comprising the steps of repeating the method to form a molded part that constitutes an upper part of the junction device except that the upper part includes annular inserts that are not threaded, and attaching the upper part to the lower part with fasteners that extend through corresponding ones of the annular inserts in the upper and lower parts.

15. The method of claim 14, further comprising the step placing a bushing between the corresponding annular inserts in a median section of the junction device that is arranged and adapted to be between the two ends of the conveyor belt.

* * * * *